United States Patent [19]
Chatigny et al.

[11] Patent Number: 4,954,811
[45] Date of Patent: Sep. 4, 1990

[54] PENETRATION SENSOR

[75] Inventors: Joseph V. Chatigny, Wayne, Pa.; Peter R. Smith, Folsom, Calif.

[73] Assignee: Pennwalt Corporation, Philadelphia, Pa.

[21] Appl. No.: 277,373

[22] Filed: Nov. 29, 1988

[51] Int. Cl.$^5$ ............................................. G08B 13/00
[52] U.S. Cl. ..................................... 340/550; 340/565; 340/566; 310/332
[58] Field of Search ............... 340/550, 541, 545, 565, 340/566; 310/800, 332

[56] References Cited

U.S. PATENT DOCUMENTS

| | | | |
|---|---|---|---|
| 2,137,852 | 11/1938 | Nicholson | 250/36 |
| 2,594,841 | 4/1952 | Arndt, Jr. | 179/100.4 |
| 2,614,114 | 10/1952 | Howatt | 171/327 |
| 2,769,867 | 11/1956 | Crownover et al. | 179/110 |
| 3,084,228 | 4/1963 | Shiga | 179/100.41 |
| 3,271,622 | 9/1966 | Malagodi et al. | 315/246 |
| 3,320,580 | 5/1967 | Sykes | 340/10 |
| 3,438,021 | 4/1969 | Nelkin et al. | 340/261 |
| 3,453,432 | 7/1969 | McHenry | 250/83.3 |
| 3,593,048 | 7/1971 | Dunegan et al. | 310/8.1 |
| 3,646,413 | 2/1972 | Oomen | 317/246 |
| 3,673,442 | 6/1972 | Sonderegger | 310/8.4 |
| 3,769,096 | 10/1973 | Ashkin et al. | 136/213 |
| 3,798,474 | 3/1974 | Cassand et al. | 310/9.6 |
| 3,809,828 | 5/1974 | Haugsjaa et al. | 179/100.41 B |
| 3,839,640 | 10/1975 | Rossin | 250/353 |
| 3,842,276 | 10/1974 | Soutgate | 250/336 |
| 3,896,311 | 7/1977 | Taylor et al. | 250/342 |
| 3,940,974 | 3/1976 | Taylor | 73/88.5 |
| 3,949,247 | 4/1976 | Fenner et al. | 310/8.6 |
| 3,967,027 | 6/1976 | Igarashi et al. | 428/212 |
| 3,970,862 | 7/1976 | Edelman et al. | 307/88 ET |
| 3,971,250 | 7/1976 | Taylor | 73/88.5 R |
| 4,087,716 | 5/1978 | Heywang | 310/332 |
| 4,092,862 | 6/1978 | Taylor | 73/362 CP |
| 4,194,194 | 3/1982 | Redfern | 340/566 |
| 4,443,730 | 4/1984 | Kitamura et al. | 310/330 |
| 4,536,753 | 8/1985 | Parker | 340/566 |
| 4,546,658 | 10/1985 | Rocha et al. | 73/862.59 |
| 4,600,855 | 7/1986 | Strachan | 310/338 |
| 4,636,917 | 1/1987 | Dvorsky et al. | 310/328 |
| 4,706,069 | 11/1987 | Tom et al. | 340/541 |
| 4,805,157 | 2/1989 | Ricketts | 310/800 |

FOREIGN PATENT DOCUMENTS 2021864 12/1979 United Kingdom.

Primary Examiner—Joseph A. Orsino
Assistant Examiner—Geoff Sutcliffe
Attorney, Agent, or Firm—Bernard F. Plantz

[57] ABSTRACT

A penetration sensor is disclosed which contains first and second transducers sandwiched around a layer which capacitively isolates the individual transducers. This sensing arrangement allows for the operational state of the sensor to be tested by applying an interrogation signal to each of the transducers.

29 Claims, 4 Drawing Sheets

PENETRATION SENSOR

BACKGROUND OF THE INVENTION

The present invention relates to a sensing device and, more particularly, to a penetration sensor for use in physical security systems.

Conventional physical security systems designed for full coverage protection generally employ a breakwire system for detecting entry through the boundaries, such as walls, floors or ceilings, of a secured area. A breakwire system consists of a thin wire which is routed in a serpentine fashion over the boundary surfaces of the area to be protected. Current is then passed through the wire in a continuous manner so that any penetration of the boundary surface by an object will break the wire and interrupt the current flow. The interrupted current flow is detected by electronic circuitry which then sounds an alarm.

Although breakwire systems are in widespread use, there are several disadvantages associated with these systems. If it is necessary to protect the secured area from very small penetrations, such as small diameter drilling, smaller diameter wire must be employed and spaced closer together to provide for adequate sensing. This significantly increases the cost of the breakwire system. Additionally, since the breakwire system will only detect the first breakage of the wire, subsequent penetrations through the boundary surface will not be detected by the system.

Transducers employing materials having both piezoelectric and pyroelectric characteristics, such as poled polyvinylidene fluoride films, have also been used in physical security systems. For example, U.S. Pat. No. 4,706,069 discloses a physical security system with a plurality of such transducers mounted on the interior walls of a secured area. Each transducer comprises a single layer of polyvinylidene fluoride film with electrodes, an adhesive layer for mounting the transducer on the wall and a protective overcoat. These transducers are capable of detecting both temperature changes and vibrations within the wall. The signal produced by a stimulated transducer is supplied to a signal processor which, based on the generated waveform, recognizes the detected activity. Thus, if the signal corresponds to a single impact, such as a baseball or wind-blown object, an alarm signal would not be generated. However, if the generated waveform indicates a sudden increase in temperature, such as a fire or an attempted break-in using a torch, an alarm signal would be generated by the system.

The single layer transducer used in U.S. Pat. No. 4,706,069 would also produce an output signal if the ambient temperature of the secured area should increase or decrease, such as when the heating or cooling system is activated. The signal processing equipment coupled to the transducer is capable of recognizing the waveform which is produced when smaller temperature changes are detected, and an alarm signal is not generated by the system. However, instead of relying on signal processing equipment, the transducer can be designed to provide for temperature compensation. An example of such a transducer is disclosed by A. L. Taylor in U.S. Pat. No. 3,971,250 issued July 27, 1976. This transducer comprises two pyroelectric sensing elements which are sandwiched around a layer of thermally and electrically insulating material. If both of the sensing elements are equally varied in temperature, such as when the ambient room temperature changes, the outputs from the individual sensing units cancel and there is no overall signal produced by the sensor. However, if the temperature of only one of the sensing units is varied, such as when infrared radiation impinges on one of the sensing elements, an overall output signal is produced by the sensing device.

Although the sensor and associated electronics disclosed by Taylor provide for adequate temperature compensation, the Taylor patent fails to disclose a sensor or system for interrogating the operational state of each of the individual sensing elements. Since the piezoelectric and pyroelectric activities of the materials used in the sensing medium in Taylor can degrade over time, a need has developed for a sensor and sensing system which allow for the operational state of the sensing units to be tested to ensure that the sensing mediums retain their piezoelectric and pyroelectric activities.

The present invention provides for such an interrogatable sensor and an interrogation system for testing the operational state of the sensing units.

SUMMARY OF THE INVENTION

The penetration sensor of the present invention comprises first and second transducers which have both piezoelectric and pyroelectric activities. Each of these transducers also contains a dielectric layer disposed adjacent to its surface. An isolation means is diposed between the dieletric layers disposed adjacent to the transducers for capacitively isolating each of the transducers. The sensor is mounted so that one of the transducers is in thermal contact with an area through which penetration is to be sensed.

The capacitive isolation feature of the sensing device of the present invention allows for the operational state of the transducers to be tested. An interrogation signal is supplied to either of the transducer elements causing the transducer element to produce mechanical energy which is then transferred through the dielectric layers and the isolation means to the other transducer. The other transducer, due to its piezoelectric activity, transforms this mechanical energy back to an electrical signal which thereby indicates that both of the transducers are operational. If the isolation feature of the present invention was not disposed between the transducers and an interrogation signal was applied to one of the transducers, an output signal would appear at the other transducer because the transducers become capacitively coupled. Thus, the sensing device would appear to be operational when one or both of the transducers have lost their piezoelectric activity.

The present invention also includes a security system employing such a sensor.

DETAILED DESCRIPTION OF THE PREFERRED EMBODIMENTS

The penetration sensor of the present invention includes a sensing layer which exhibits both piezoelectric and pyroelectric activities. Polyvinylidene fluoride (PVDF) is an example of a polymer film that exhibits both of these activities and is suitable for use in the present invention. Polyvinylidene fluoride is approximately 50% crystalline and 50% amorphous. The principle crystalline forms of PVDF are the highly polar beta form and the non-polar alpha form. High piezoelectric and pyroelectric activities are associated with the polar beta form. In order to increase both the piezoelectric and pyroelectric activities of PVDF, the film is mechanically oriented and subjected to an intense electrical field, otherwise known as poling, to cause the oriented beta form crystallites to predominate. Polyvinylidene fluoride films which have been treated in this manner are available from the Pennwalt Corporation, Philadelphia, Penn. Other piezoelectric and pyroelectric polymer films, including copolymers having a major proportion of vinylidene fluoride and at least one copolymerizable comonomer, preferably a fluorinated olefinic comonomer, such as trifluoroethylene or tetrafluoroethylene, may also be used as the sensing layer in the present invention. Although piezoelectric and pyroelectric polymer films are preferred, other materials exhibiting both piezoelectric and pyroelectric activities, such as piezoceramic composite sheet material, may also be employed.

Figure 1:
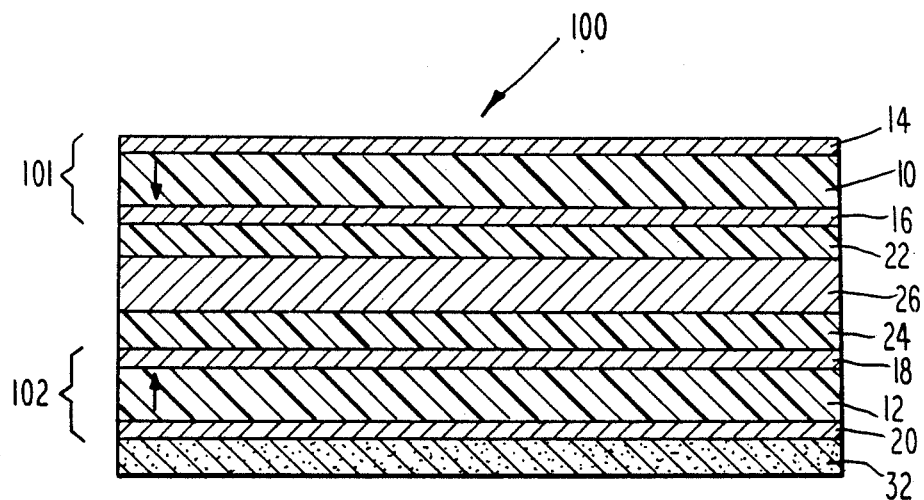
FIG. 1 is a cross section of the sensor of the present invention.

Referring now to the figures, where like reference numerals identify like elements, FIG. 1 illustrates the penetration sensor 100 of the first embodiment of the present invention. The sensor 100 has first and second transducers 101 and 102, respectively, disposed in a stacked configuration. The sensor 100 also includes a first sensing layer 10 and a second sensing layer 12, each having both piezoelectric and pyroelectric activities. For discussion purposes, a poled polyvinylidene fluoride polymeric film will be used as the first and second sensing layers 10 and 12, respectively. As shown in the figure by the arrows, the polyvinylidene fluoride films are arranged such that their poling directions are substantially parallel, but in opposed directions. The poled polyvinylidene fluoride films are also mechanically oriented in substantially parallel directions. The PVDF film will generally have a thickness ranging from about 9 microns ($\mu$m) to about 200 $\mu$m.

The sensor 100 also includes first and second electrodes 14 and 16, respectively, which are electrically coupled with the opposed surfaces of the first sensing layer 10. The third and fourth electrodes 18 and 20, respectively, are also electrically coupled with the opposed surfaces of the second sensing layer 12. The electrodes are formed on the sensing layers 10 and 12 using conventional techniques. Thin film metals, such as silver, nickel, aluminum, gold, or alloys thereof, may be deposited on the opposed surfaces of the sensing layers 10 and 12 by vacuum evaporating or sputtering. These thin film metals have thicknesses which generally range between about 100 Å (Angstroms) to about 1000 Å. Alternatively, the electrodes may be continuously deposited across the opposed surfaces of the sensing layers 10 and 12 by screen printing an electroconductive ink, such as silver flake filled urethane or carbon based conductive coatings. The electrodes formed from electroconductive inks have thicknesses ranging between about 0.5 $\mu$m to about 2 $\mu$m. As an alternative to evaporatively deposited or screen printed electrodes, foils of copper, aluminum or other conductors, typically 10 $\mu$m to 100 $\mu$m in thickness, can be adhesively applied and capacitively coupled to the unmetallized sensing layer.

A first dielectric layer 22 is disposed adjacent to the second electrode 16. In a similar manner, a second dielectric layer 24 is disposed adjacent the third electrode 18. These dielectric layers have thicknesses ranging between about 25 $\mu$m and about 200 $\mu$m. Flexible polymeric dielectric materials, such as polyethylene terephthalate resin films, may be used as the first and second dielectric layers 22 and 24, respectively. Other conventional dielectric films, such as polyvinylidene fluoride and polychlorotrifluoroethylene, may also be used. Alternatively, a thick film dielectric adhesive, such as acrylic, urethane and silicone, may be employed.

An isolation layer 26 is disposed between the first and second dielectric layers 22 and 24, respectively, for capacitively isolating the transducers 101 and 102. The layer 26 may be a metallic foil, having a thickness between about 10 $\mu$m to about 200 $\mu$m, which is electrically coupled to ground (not shown). Alternatively, a flexible metallized polymeric film, such as polyethylene terephthalate resin sheet, may be employed. The metallized portion of such a film is connected to ground. In order to provide for thermal matching of the layers which make up the sensing device, a metallized unpoled polyvinylidene fluoride film may also be used as the layer 26. The polyvinylidene fluoride film would, however, be mechanically oriented in the same direction as the PVDF films used to form the first and second sensing layers 10 and 12, respectively. The metallized polymer film used as the layer 26 has a total thickness ranging between about 25 $\mu$m to about 250 $\mu$m, with the metallization ranging between about 400 Å to about 1000 Å.

The sensor 100 is assembled by adhesively sandwiching the isolation layer 26 between the first and second dielectric layers 22 and 24, respectively. The first and second transducers 101 and 102 respectively, are then adhesively sandwiched around the dielectric layers 22 and 24. Suitable adhesives for use in forming the assembly include silicon-based adhesives, such as Dow Corning 93076-83 and General Electric 518.

The sensor 100 also includes an adhesive layer 32 for mounting the stocked assembly over the boundary area, such as a wall, through which penetration is to be sensed. Silicon-based pressure sensitive or wet adhesives are preferred. Alternatively, a thin dielectric layer (not shown), such as polyethylene terephthalate film, may be interposed and adhesively secured to the fourth electrode 20 and the area through which penetration is to be sensed. The materials used to mount the sensor 100 should, however, allow for the transfer of thermal energy to the second transducer 102 when the device is to be used to detect thermal penetration, such as an intruder using a cutting torch, through the boundary area. For example, the sensor may be mounted with thermally (metallic) loaded acrylic, urethane or silicon based adhesives.

Figure 2:
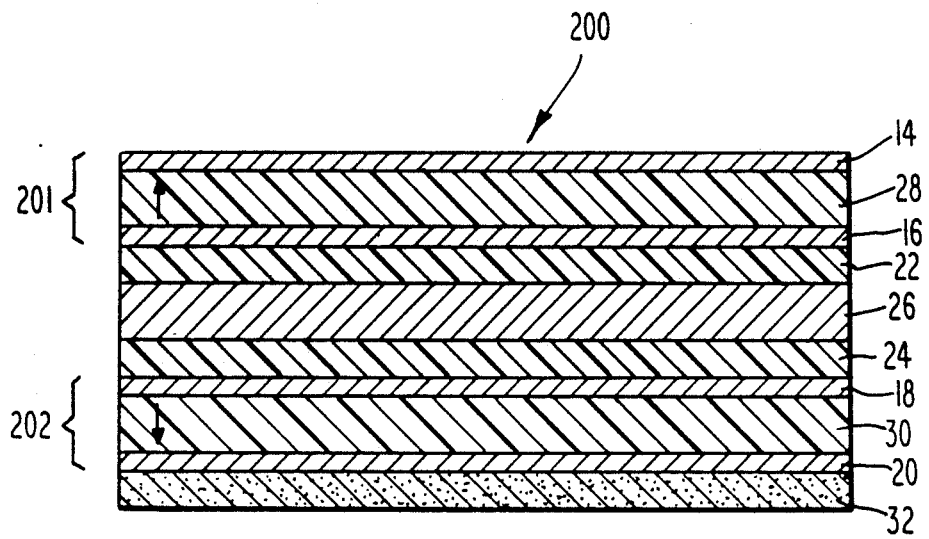
FIG. 2 is a cross section of an alternative sensor of the present invention.

Turning now to FIG. 2, a penetration sensor of the second embodiment of the present invention is generally designated as 200. The sensor 200 includes first and second transducers 201 and 202, respectively. As shown in the figure, the sensor 200 differs only from sensor 100 in that the first and second sensing layers 28 and 30 are fabricated from poled polyvinylidene fluoride films have been inverted from the arrangement shown in FIG. 1. The sensor 200 would otherwise be manufactured in the same manner as will be described for the sensor 100.

Figure 3:
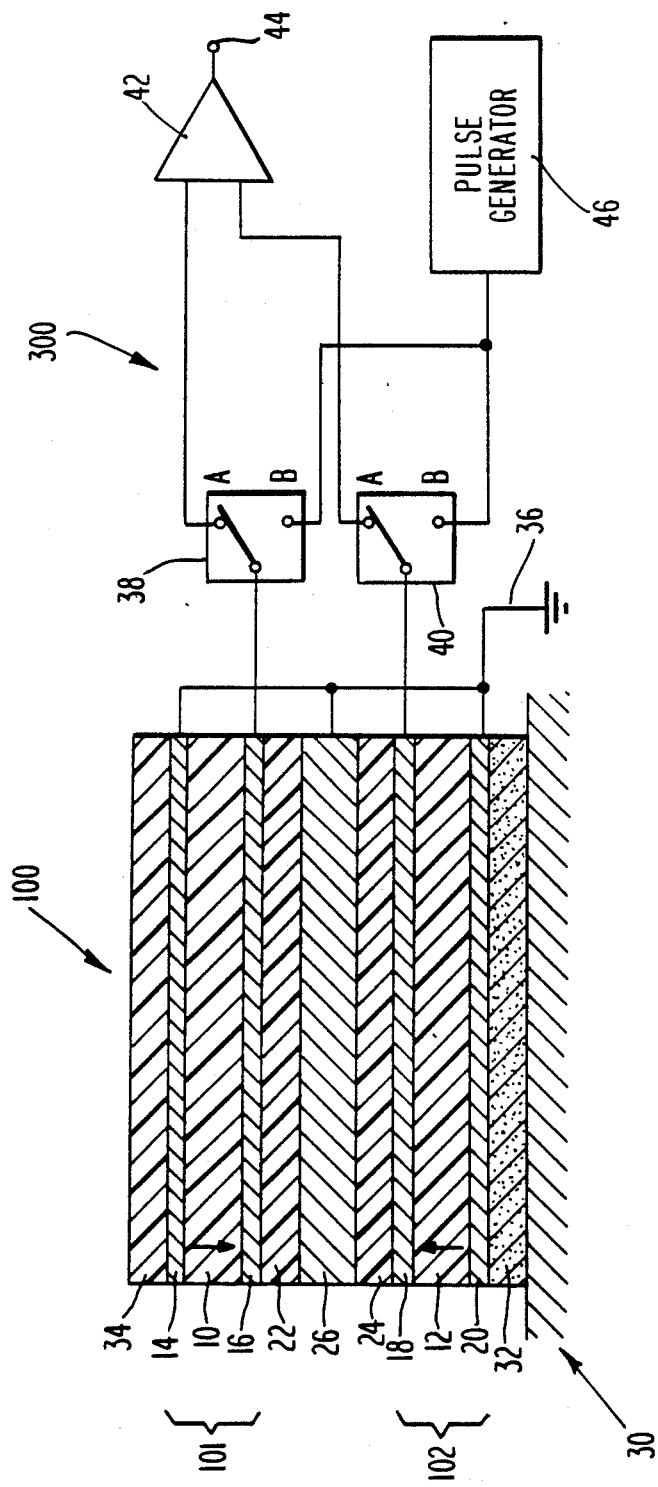
FIG. 3 illustrates the sensor of FIG. 1 electrically coupled to circuitry used to sense the outputs and interrogate the operational state of the transducers.

Turning now to FIG. 3, the sensor 100 is shown electrically coupled to the circuitry 300 used to sense the outputs and interrogate the operational state of the transducers 101 and 102. The sensor 100 is attached to a surface 30, such as the interior wall of a secured room, with the adhesive layer 32. An encapsulating layer 34 is also provided over the first electrode 14 to protect the sensor from mechanical abuse. Suitable materials for use as the layer 34 include a polymer film, such as polyethylene terephthalate and unpoled polyvinylidene fluoride.

The first electrode 14, the electroconductive layer of the isolation layer 26 and the fourth electrode 20 are electrically coupled to ground with the wiring 36. The second electrode 16 is connected to a first switch 38. The third electrode 18 is connected to a second switch 40. As shown in the figure where both switches are in the "A" position, the outputs of the first and second transducers 101 and 102, respectively, are electrically connected to a differential amplifier 42 having an output 44.

The differential amplifier 42 provides common mode rejection of the output signals that are produced when both of the transducers 101 and 102 are similarly stimulated. For example, if the wall 30 is impacted with a hammer, but penetration does not occur, the vibrations produced within the wall are transmitted to the sensor 100 such that the first and second transducers 101 and 102, respectively, are stimulated at substantially the same point in time. The output signals of the transducers 101 and 102 have substantially the same magnitude and are in phase. When these signals are supplied to the amplifier 42, a signal is not produced at the output 44. The same phenomenon occurs when the ambient temperature of the secured room changes or when the sensor 100 is subjected to electromagnetic interference (EMI), radio frequency interference (RFR) and electrostatic discharge (ESD) noise.

If a drill is used to gain access through the wall 30, the second transducer 102 is penetrated before the first transducer 101. Since the penetration of the two transducers is not simultaneous, the differential amplifier 42 produces a signal at the output 44 indicating penetration into the secured area. In a similar manner, if an intruder attempts to gain access by heating the wall 30 with a cutting torch, the thermal energy which penetrates the wall 30 is transferred to the second transducer 102. Since the dielectric layers 22 and 24 interposed between the transducers 101 and 102 have a low thermal conductivity, a temperature gradient is produced across the sensor 100. This condition would also cause the differential amplifier to produce an output at 44. The sensor 100 would also detect penetrations through the wall 30 with a knife, hammer and nail, explosives, fired projectiles, chemical etchants and other forms of entry which do not simultaneously stimulate the transducers 101 and 102.

The circuit 300 also includes a pulse generating means 46 for supplying an interrogating signal to either of the transducers 101 or 102. The pulse generating means 46 and associated circuitry can be operated using a wide variety of waveforms. The circuitry used to generate such waveforms will vary, but is simple and well known. The pulse generating means 46 can be an op-amp signal generator with a class AB or class B power driven output stage using power transistors or power field effect transistors.

The simplest waveform for use as the interrogating signal is a single pulse of voltage of a short duration. Waveforms, such as a square wave, a spike, a half sine wave and the like are suitable for the present invention. The pulse width can be, but is not limited to, less than a microsecond to many milliseconds. The amplitude can be, but again is not limited to, fractions of a volt to many hundreds of volts. The pulse repetition rate varies depending on the requirements for interrogating the operational state of the transducers. This rate can be on the order of several times a second to several times a day.

In order to make the identification of the interrogating signal more reliable, the pulse generating means 46 can provide an encoded pulse waveform. This can be a string of pulses that are digitally encoded in frequency, spacing, quantity and duration. Other encoding techniques using simple frequency encoding can also be employed. These frequencies range from about a few hundred to many megaHertz, although other frequency ranges can also be used. A combination of both the encoding techniques can also be used in the present invention.

The operational state of the first and second transducers 101 and 102 is tested by moving either the first switch 38 or the second switch 40 to the "B" position. If the second switch 40 is moved to the "B" position, the interrogating signal provided by the pulse generating means 46 will cause the second transducer 102 to vibrate. This vibration is then transferred through the second dielectric layer 24, the isolation means 26, the first dielectric layer 22 and is detected by the first transducer 101. The first transducer 101 converts the mechanical energy back to an electrical signal which is then supplied to the differential amplifier 42. Since the other input of the differential amplifier 42 is not connected, an output signal is produced at 44 indicating that the transducers are operational. Alternatively, the interrogation signal may be supplied to the first transducer 101 by moving the first switch to the "B" position while the second switch 40 is in the "A" position.

If the capacitive isolation means 26 was not present, the interrogation signal which is supplied to either of the transducers would cause the two transducers to become capacitively coupled thereby producing an output signal. When capacitive coupling occurs, the true operational state of the piezoelectric activity of the sensing layers 10 and 12 can not be determined because an output would be produced even when one or both of the sensing layers 10 and 12 have lost their piezoelectric activity. However, with the use of the isolation layer 26, the output signal is only produced when the transducer connected to the interrogation means converts the electrical energy into mechanical energy which is transferred to the other transducer where mechanical energy is reconverted back to electrical energy for detection.

Figure 4:
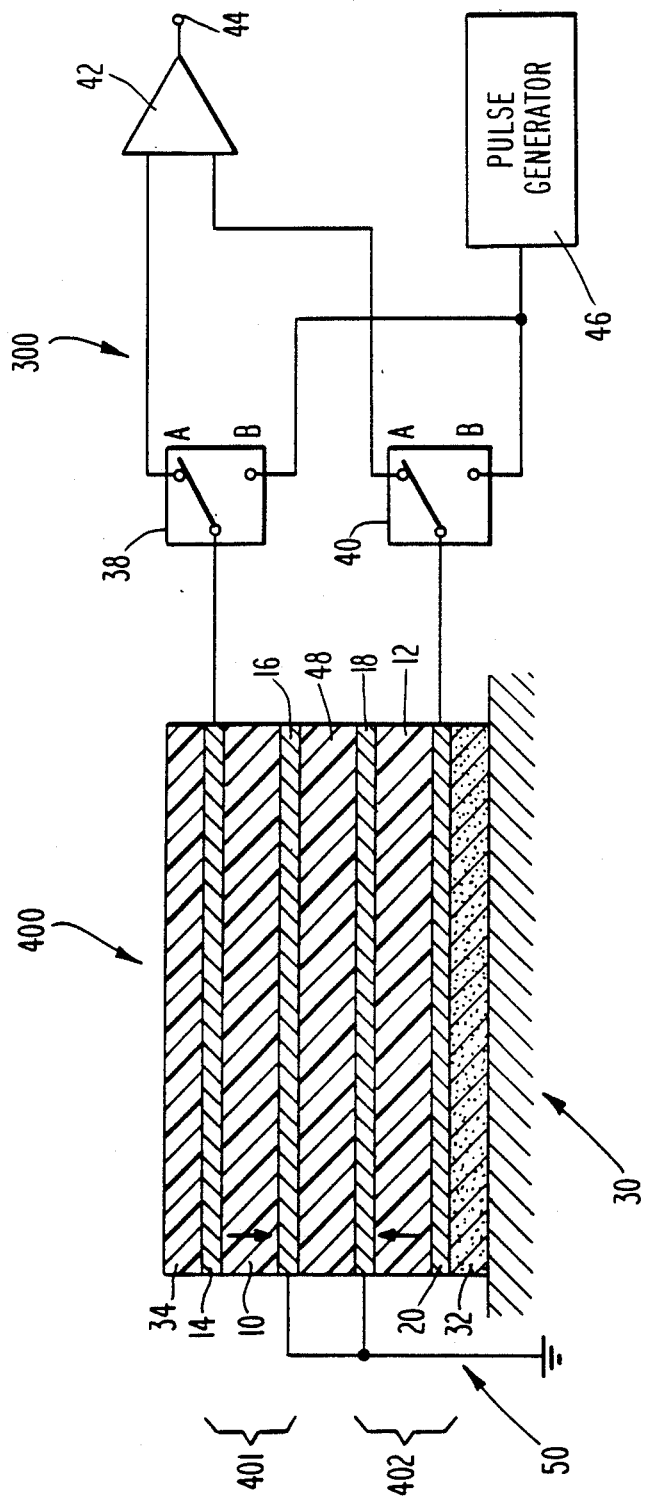
FIG. 4 illustrates an alternative sensor and circuit arrangement of the present invention where capacitive isolation of the transducers is achieved by grounding the appropriate electrodes.

FIG. 4 illustrates an alternative sensor 400 which is electrically connected to the sensing circuit 300 previously described in FIG. 3. In the sensor 400, the isolation layer 26 has been removed and replaced with a single dielectric layer 48, such as polyethylene terephthalate film. Alternatively, a plurality of dielectric layers (not shown) may be positioned between the second and third electrodes 16 and 18, respectively. The dielectric layer 48 has a thickness of about 25 μm to about 250 μm. This arrangement may be used if the second and third elctrodes 16 and 18 are electrically coupled to ground. These grounded electrodes provide the capacitive isolation between the first and second transducers 401 and 402, respectively, during the interrogation mode. However, since the outermost electrodes 14 and 20 are ungrounded, the sensing device 400 would generally only be used in environments with low electromagnetic interference signals. The sensing circuit 300 functions in the same manner as described for FIG. 3.

Figure 5:
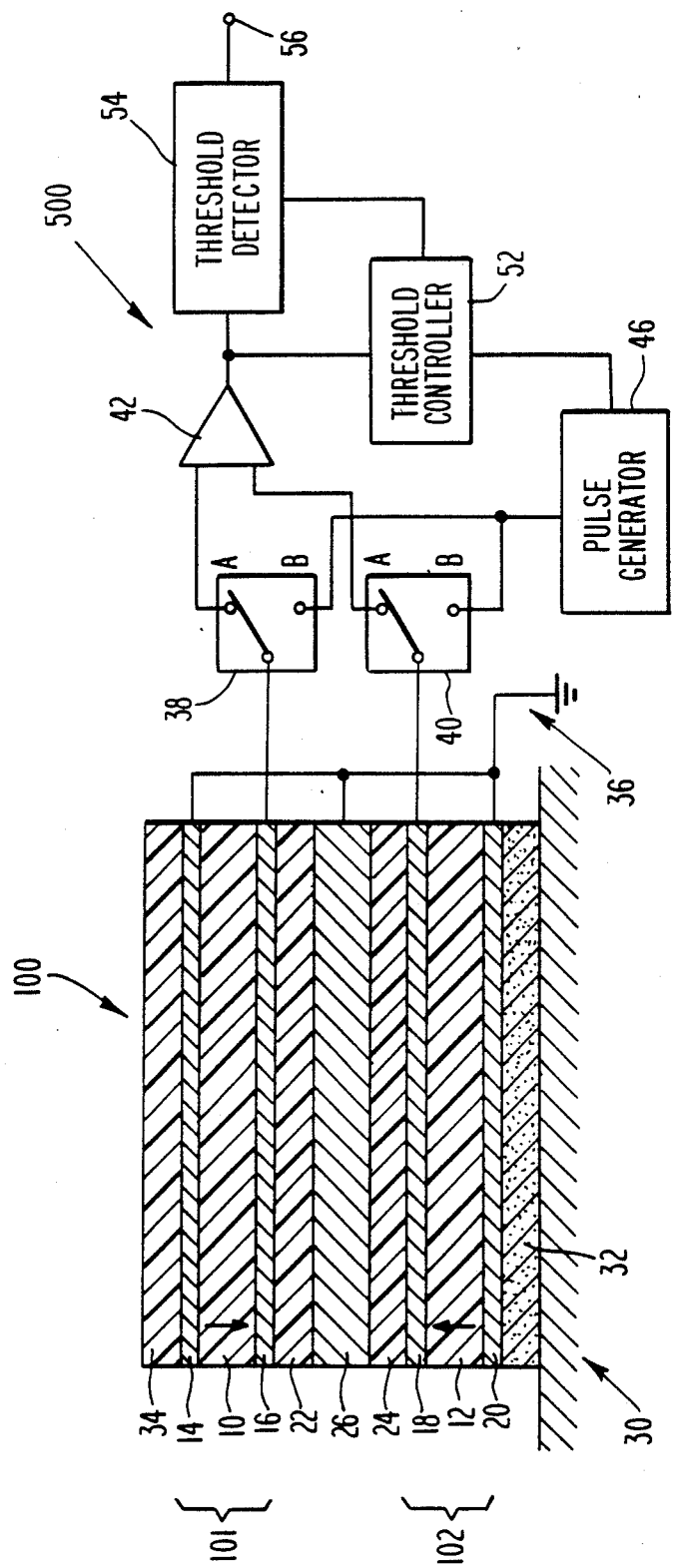
FIG. 5 illustrates alternative electrical circuitry of the present invention electrically coupled with the sensor of FIG. 1.

Turning now to FIG. 5, the sensor 100 is shown electrically coupled to an alternative sensing circuitry 500 which provides dynamic threshold adjustment. The circuitry 500 includes a threshold controller 52 and a threshold detector 54 electrically coupled to the output from the differential amplifier 42. The threshold detector 54 is a circuit that compares the signal voltage from the differential amplifier 42 to an established reference or threshold voltage. The circuit then provides an output indicating whether the signal voltage from the differential amplifier 42 is greater or less than the threshold voltage.

Voltage comparators, such as LM 393 manufactured by Motorola, can be used as the threshold detector 54. This voltage comparator has two inputs, one for the reference or threshold voltage generated by the threshold controller 52 and the other for the signal voltage from the differential amplifier 42. The voltage comparator has one output 56 which will be "high" when the signal voltage from the differential amplifier 42 is greater than the reference or threshold voltage. This output 56 will be "low" when the signal voltage from the differential amplifier 42 is less than the reference or threshold voltage.

The threshold detector 54 is used to determine if the signal from the differential amplifier 42 is generated by penetration of the wall 30. Signals that are the product of noise, such as vibrations in the wall 30 or ambient temperature changes, are generally rejected because of the common mode rejection which occurs at the differential amplifier 42. However, signals which are the product of penetration will produce very large amplitudes which the threshold detector 54 will measure and compare to the threshold voltage. If the general signal is greater than the threshold voltage, a "high" voltage is produced at the output 56 indicating an alarm state.

The actual value of the threshold or referencce voltage is an important parameter since it determines the basic sensitivity of the system. Because the sensitivities of the sensing layers 10 and 12 and the electronics may vary with the ambient temperature, humidity and age of the components, the use of a fixed threshold level will give the system a sensitivity that may vary with the environment and age.

The threshold controller 52 is employed to account for these sensitivity changes in the system. The threshold controller 52 uses the amplitude of the output signal produced by the differential amplifier 42 during the interrogation mode to establish and set the level of the reference or threshold voltage in the threshold detector 54. For example, if the amplitude of the output from the differential amplifier 42 produced during the interrogation mode is lower than expected, the threshold controller 52 will lower the threshold value used for comparison in the threshold detector 54 during the sensing mode. In a similar manner, if the output signal produced during interrogation is higher, the threshold controller 52 will raise the threshold value used by the threshold detector 54.

Circuits which can be used as the threshold controller 52 include an amplifier (not shown) and a sample and hold circuit (not shown), such as National Semiconductor's LF398. The amplifier is used to condition and adjust the output signal which is received from the differential amplifier 42 during the interrogation mode. The sample and hold circuit has two inputs, one for receiving the conditioned signal from the amplifier and the other for receiving the sample/hold instruction, which in the present invention is supplied by the pulse generator 46. Because of the short duration of this signal, the sample and hold circuit samples the conditioned signal and sets a DC voltage when the sample/hold input switches from sample to hold. This DC voltage is then supplied to the threshold detector 54 where it is used as the threshold or reference voltage.

Although not shown in the figures, the threshold controller 52 and threshold detector 54 may also be connected to the output 44 of the differential amplifier 42 shown in FIG. 4.

The sensing device of the present invention may be applied to selected regions of the boundary of a secured area. However, maximum penetration detection is achieved when it is applied over substantially all of the boundary surfaces. For example, if the secured area is a room or vault, the sensing device is applied in a wallpaper-like fashion over substantially all of the wall surfaces. The sensor would also be applied to cover the ceiling and floor areas as well. Since the sensor is fabricated from flexible polymer and thin film electroconductive materials, it may be applied in a continuous fashion over nonplanar surfaces. The sensor may be manufactured in large sheets which are cut to virtually any size or shape.

We claim:

1. A penetration sensor, comprising:
    a first transducer having both piezoelectric and pyroelectric activities;
    a first dielectric layer disposed adjacent to said first transducer;
    a second transducer having both piezoelectric and pyroelectric activities;
    a second dielectric layer disposed adjacent to said second transducer;
    isolation means disposed between said first and second dielectric layers for capacitively isolating said first and second transducers;
    said first and second transducers arranged to form a stacked assembly with said first and second dielectric layers and said isolation means disposed therebetween; and
    means for mounting one of said transducers in thermal contact with an area through which penetration is to be sensed.

2. A penetration sensor according to claim 1 wherein said isolation means comprises a grounded electroconductive layer.

3. A penetration sensor according to claim 2 wherein said means for mounting comprises an adhesive layer disposed over one of said transducers.

4. A penetration sensor, comprising:
    a first transducer comprising a first poled polymeric film having both piezoelectric and pyroelectric activities and a pair of opposed sides,
a first electrode electrically coupled with one of said opposed surfaces, and
a second electrode electrically coupled with the other of said opposed surfaces;
a second transducer comprising
a second poled polymeric film having both piezoelectric and pyroelectric activities and a pair of opposed sides,
a third electrode electrically coupled with one of said opposed surfaces of said second poled polymeric film, and
a fourth electrode electrically coupled with the other of said opposed surfaces of said second poled polymeric film;
a first dielectric layer disposed over the surface of said second electrode;
a second dielectric layer disposed over the surface of said third electrode;
isolation means disposed between said first and second dielectric layers for capacitively isolating said first and second transducers;
said first and second transducers arranged to form a stacked assembly with said first and second dielectric layers and said isolation means disposed therebetween; and
means for mounting one of said transducers in thermal contact with an area through which penetration is to be sensed.

5. A penetration sensor according to claim 4 wherein said isolation means comprises a grounded electroconductive layer.

6. A penetration sensor according to claim 4 wherein said first poled polymeric film and said second poled polymeric film are fabricated from the same polymeric material.

7. A penetration sensor according to claim 6 wherein said isolation means comprises:
an unpoled layer of said polymeric material used to fabricate said first and second polymer films with a grounded electroconductive layer in surface-to-surface contact with said unpoled layer.

8. A penetration sensor according to claim 7 wherein said polymeric material comprises polyvinylidene fluoride.

9. A penetration sensor according to claim 6 wherein the poling directions of said first and second poled polymeric films are substantially opposite.

10. A penetration sensor according to claim 9, further comprising:
means for electrically coupling said first and fourth electrodes to ground.

11. A sensing system, comprising:
a sensor comprising
a first transducer having both piezoelectric and pyroelectric activities,
a first dielectric layer disposed adjacent to said first transducer,
a second transducer having both piezoelectric and pyroelectric activities,
a second dielectric layer disposed adjacent to said second transducer, and
isolation means disposed between said first and second dielectric layers for capacitively isolating said first and second transducers;
detecting means responsive to said first and second transducers for producing an output signal when said transducers are not similarly stimulated; and
interrogation means for supplying an interrogating signal to one of said first and second transducers whereby mechanical energy is produced and transferred through said first and second dielectric layers and said isolation means to the other of said first and second transducers where a corresponding electrical signal is produced thereby indicating that said first and second transducers are operational.

12. A sensing system according to claim 11, further comprising:
threshold detecting means responsive to said detecting means for producing an alarm signal when the amplitude of said output signal exceeds a threshold value; and
threshold controlling means for adjusting said threshold value in response to the amplitude of the output signal produced by said detecting means when the interrogation signal is supplied to one of said first and second transducers.

13. A sensing system according to claim 11 wherein said first and second transducers are arranged to form a stacked assembly with said first and second dielectric layers and said isolation means disposed therebetween.

14. A sensing system according to claim 13 wherein said sensor further comprises:
means for mounting one of said transducers in thermal contact with an area through which penetration is to be sensed.

15. A sensing system according to claim 11 further comprising:
switching means electrically coupled to said first and second transducers for making selective electrical connections with said detecting means and said interrogation means.

16. A security system according to claim 11 wherein said isolation means comprises a grounded electroconductive layer.

17. A security system, comprising:
a penetration sensor comprising
a first transducer comprising a first poled polymeric film having both piezoelectric and pyroelectric activities and a pair of opposed sides, a first electrode electrically coupled with one of said opposed surfaces, and a second electrode electrically coupled with the other of said opposed surfaces,
a second transducer comprising a second poled polymeric film having both piezoelectric and pyroelectric activities and a pair of opposed sides, a third electrode electrically coupled with one of said opposed surfaces of said second poled polymeric film, and a fourth electrode electrically coupled with the other of said opposed surfaces of said second poled polymer film,
a first dielectric layer disposed over the surface of said second electrode,
a second dielectric layer disposed over the surface of said third electrode, and
isolation means disposed between said first and second dielectric layers for capacitively isolating said first and second transducers;
detecting means responsive to said first and second transducers for producing an output signal when said transducers are not similarly stimulated; and interrogation means for supplying an interrogating signal to one of said first and second transducers whereby mechanical energy is produced and transferred through said first and second dielectric layers and said isolation means to the other of said first and second transducers where a corresponding electrical signal is produced and detected by said detecting means indicating that said first and second transducers are operational.

18. A security system according to claim 17, further comprising:
threshold detecting means responsive to said detecting means for producing an alarm signal when the amplitude of said output signal exceeds a threshold value; and
threshold controlling means for adjusting said threshold value in response to the amplitude of the output signal produced by said detecting means when the interrogation signal is supplied to one of said first and second transducers.

19. A security system according to claim 17 wherein said first and second transducers are arranged to form a stacked assembly with said first and second dielectric layers and said isolation means disposed therebetween.

20. A security system according to claim 19 wherein said penetration sensor further comprises:
means for mounting one of said transducers in thermal contact with an area through which penetration is to be sensed.

21. A security system according to claim 17 further comprising:
switching means electrically coupled to said first and second transducers for making selective electrical connections with said detecting means and said interrogation means.

22. A security system according to claim 17 wherein said isolation means comprises a grounded electroconductive layer.

23. A security system according to claim 17 wherein said first poled polymeric film and said second poled polymeric film are fabricated from the same polymeric material.

24. A security system according to claim 23 wherein said isolation means comprises an unpoled layer of said polymeric material used to fabricate said first and second poled polymer films with a grounded electroconductive layer in surface-to-surface contact with said unpoled layer.

25. A security system according to claim 24 wherein said polymeric material comprises polyvinylidene fluoride.

26. A security system according to claim 23 wherein the poling directions of said first and second poled polymeric film are substantially opposite.

27. A security system according to claim 23 wherein said first and fourth electrodes are grounded and said detecting means is electrically coupled to said second and third electrodes.

28. A security system according to claim 23 wherein said first and fourth electrodes are grounded and said interrogation means supply an interrogation signal to one of said second and third electrodes.

29. A security system, comprising:
a penetration sensor comprising
a first transducer comprising a first poled polymeric film having both piezoelectric and pyroelectric activity and a pair of opposed sides, a first electrode electrically coupled with one of said opposed surfaces and a second electrode electrically coupled with the other of said opposed surfaces,
a second transducer comprising a second poled polymeric film having both piezoelectric and pyroelectric activities, a pair of opposed sides and a poling direction substantially opposite to that of said first poled polymeric film, a third electrode electrically coupled with one of said opposed surfaces of said second poled polymeric film and a fourth electrode electrically coupled with the other of said opposed surfaces of said second poled polymeric film, and
at least one dielectric layer disposed between said second and third electrodes;
means for electrically grounding said second and third electrodes;
detecting means electrically coupled to said first and fourth electrodes for detecting when said first and second transducers are not similarly stimulated; and
interrogation means for supplying an interrogating signal to one of said first and fourth electrodes whereby mechanical energy is produced by one of said first and second transducers and transmitted through said dielectric layer to the other of said first and second transducers where a corresponding electrical signal is produced thereby indicating said first and second transducers are operational.

* * * * *